March 23, 1943. T. A. BAKER 2,314,569
FLUID SYSTEM AND REGULATING DEVICES THEREFOR
Filed June 15, 1940 2 Sheets-Sheet 1
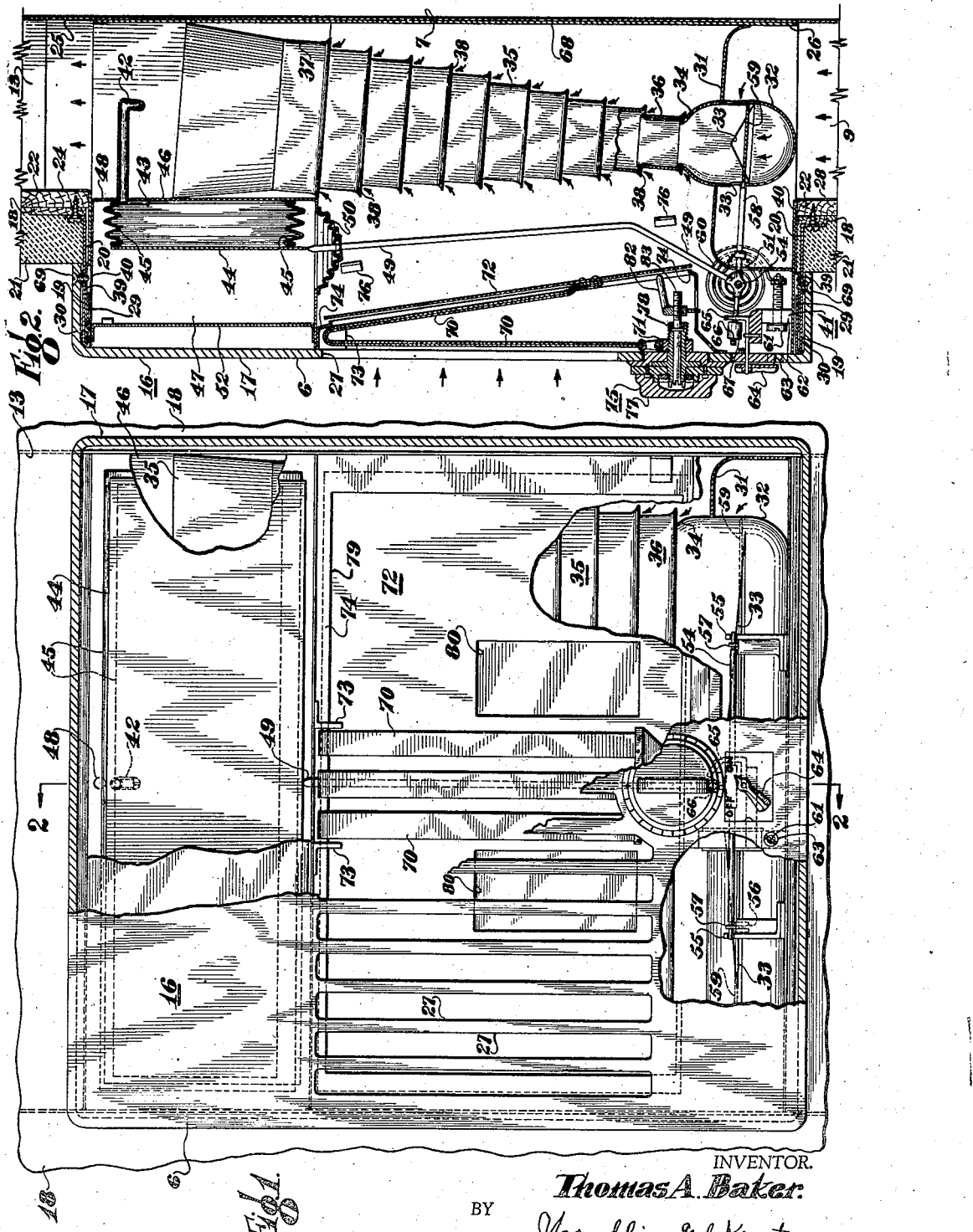
INVENTOR.
*Thomas A. Baker*
BY *Woodling and Krost*
ATTORNEY.

March 23, 1943.　　　T. A. BAKER　　　2,314,569
FLUID SYSTEM AND REGULATING DEVICES THEREFOR
Filed June 15, 1940　　　2 Sheets-Sheet 2
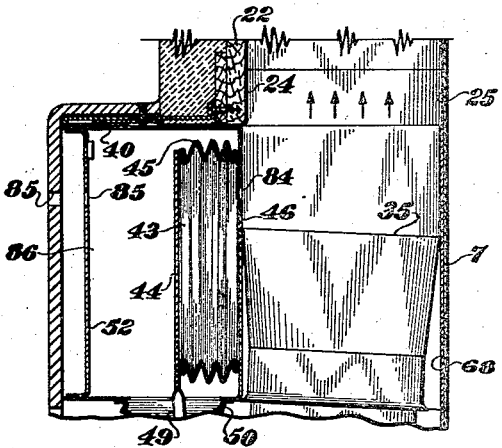
Fig. 3.
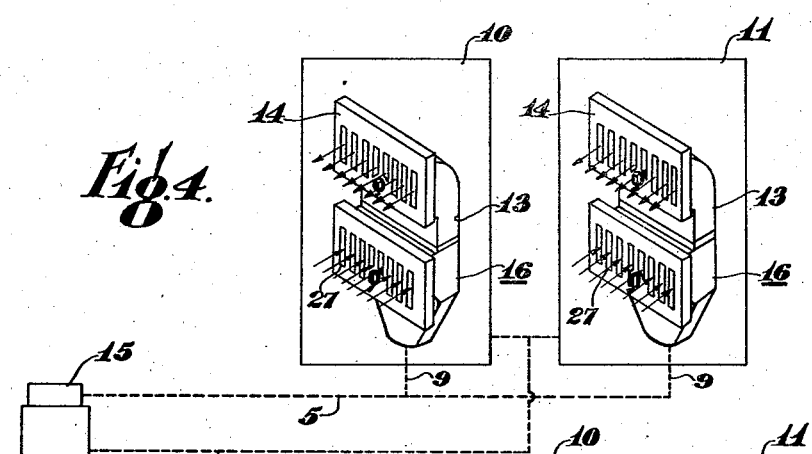
Fig. 4.
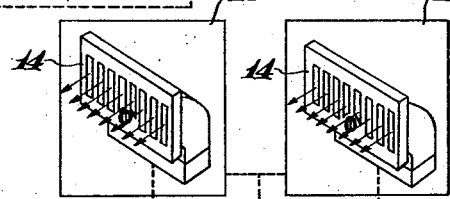
Fig. 5.
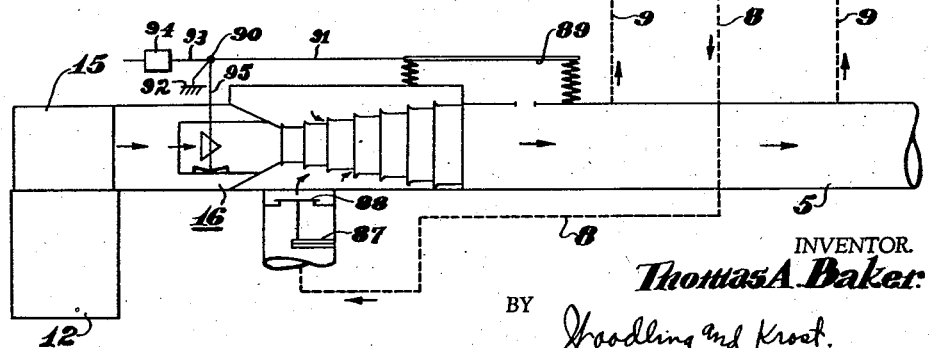
INVENTOR.
Thomas A. Baker
BY Hoodling and Kroet.
ATTORNEY.

UNITED STATES PATENT OFFICE 2,314,569

FLUID SYSTEM AND REGULATING DEVICE THEREFOR

Thomas A. Baker, Logansport, Ind.

Application June 15, 1940, Serial No. 340,852

9 Claims. (Cl. 98—33)

My invention pertains to a fluid system and a regulating device therefor and more particularly to an air conditioning system and regulating device which will regulate the flow of conditioned air to an enclosure.

My device is adapted to mix treated or primary air from a furnace, air conditioner and/or ventilator with untreated or secondary air from some other source; the preferred source of said secondary air being the room into which the primary air is discharged.

An object of my invention is to provide a device for mixing primary air with secondary air in accordance with the condition of the secondary air.

Another object of my invention is to thermostatically regulate the temperature of a room or enclosure by the temperature of the air which is removed therefrom for recirculation.

Still another object of my invention is to provide a device for regulating the temperature of a substantially constant flow of air into a room.

A further object of my invention is to maintain a substantially constant flow of air into an enclosure.

Another object of my invention is to provide a device for mixing primary and secondary air in proportions regulated by the condition of the secondary air.

A still further object of my invention is to provide a heating, cooling and/or ventilating system for a plurality of enclosures in which different conditions may be set for the various enclosures and the enclosures maintained at those conditions independently of each other.

Another object of my invention is to provide a heating, cooling and/or ventilating system for a plurality of enclosures in which no enclosure will rob the system of more than its share of the treated air to the exclusion of the other enclosures in the system.

Still another object of my invention is to provide a device which will automatically shut off or restrict the flow of conditioned air to an enclosure when the flow increases to a rate which tends to draw the conditioned air from the distribution system to the detriment of the other enclosures in the system.

A still further object of my invention is to provide a conditioning system having individual automatic dampening devices for the enclosures to be conditioned.

An object of my invention is to provide a device for regulating the temperature of a constant flow of air into a room.

Another object of my invention is to provide a device which will maintain at substantially a constant value the flow of air into a room.

Another object of my invention is the provision of a device for mixing primary air with secondary or recirculated air and to thermostatically regulate the flow of the secondary air to control the temperature of the room or enclosure into which the air flows.

A further object of my invention is to provide a device for maintaining constant the total flow of primary and secondary air into a room and to regulate the temperature of the air in the room by regulating the volume of secondary air recirculated through the device, thereby regulating the flow of the primary air to maintain the constant flow.

Another object of my invention is to circulate the air is a room and to supplement the recirculated or secondary air with fresh or primary air.

A further object of my invention is to provide a system for heating or cooling a plurality of rooms or enclosures wherein each room or enclosure may be maintained at its own temperature independent of the temperatures of the other rooms or enclosures.

Another object of my invention is to provide a device for passing primary air into an enclosure and to provide said device with an induction means for inducing secondary air into the primary air stream in quantities determined by the condition of the said secondary air.

Still another object of my invention is to provide a device for delivering a substantially constant volume of air to a room regardless of the variations in the pressure head of the primary air.

A still further object of my invention is to provide an air conditioning system in which the distribution sytesm need not be designed to have substantially identical pressure head values at all outlets.

A further object of my invention is to provide an air conditioning system having a plurality of outlets each of which will discharge a substantially constant volume of conditioned air so long as the pressure head of the primary air does not drop below the pressure head requirement for any one of the outlets.

Another object of my invention is to provide a single device for regulating the volume and temperature of air delivered to a plurality of rooms or enclosures and to control the device from the plurality of rooms.

Other objects and a fuller understanding of my invention may be had by referring to the following description and claims, taken in conjunction with the accompanying drawings, in which:

Figure 1 is a front view of my device mounted on a wall and with parts broken away to show the mechanism;

Figure 2 is a cross-sectional view of my device taken along line 2—2 of Figure 1;

Figure 3 is a sectional view of a portion of a modified device;

Figure 4 is a diagrammatic view of a system into which my device is adapted to be placed; and Figure 5 is a diagrammatic view of a modified system into which my device is adapted to be placed.

My regulating device indicated generally by the reference character 16 and my distribution system 5 are adapted to regulate the condition of air in a plurality of enclosures or rooms such as 10 and 11 (see Figure 4). By condition is meant the temperature, the humidity, the freshness, the rate of change of air in the room and all other elements which go to make up desired comfortable qualities in air. My device and system are also adapted to regulate the flow of other fluids beside air and my application and claims are to be read with this in mind. The fluid distribution system 5 may be similar to the one shown and described in my application entitled Isostatic fluid distribution systems, Serial No. 340,851, filed June 15, 1940, wherein the reference character 16 in said application represents my regulating device.

One of my regulating devices 16 may be placed in enclosure 10 and another in enclosure 11 and each may be set to maintain a desired temperature in its respective enclosure and to circulate the air in the enclosure at a certain rate. An air conditioner 12 may be placed in the basement of a building and through the distribution system 5 and a plurality of branches 9 supply conditioned air to the regulating devices 16. Each regulating device may be set to regulate the condition of its enclosure independently of the action of the other regulating devices in the system.

The regulating device 16 comprises a housing 17 adapted to be attached to a wall 18, part of the housing being within the wall and part of the housing extending out of the wall and forming a register through which air may be taken into the housing 17. While my regulating device may be located on, or attached to, a wall, I would like to bring out the point that my device may be located in any position and of course, it does not need to be attached to anything, except ducts or stacks supplying the primary air to the equipment and some means provided for discharging the air from the equipment.

In the installation of my regulating device a branch conduit 9 is run from the distribution system 5 to my regulating device, after which air is distributed to the room 10. The part of the branch conduit above the regulating device is known as the stack and is indicated by the reference character 13. The branch conduit 9 and the stack 13 are shown having a common sheet metal back wall 7. The sheet metal front wall of the branch 9 is indicated by the reference character 28 and the sheet metal front wall of the stack 13 is indicated by the reference character 24. The sheet metal back wall 7, the front wall 28 of the branch 9 and the front wall 24 of the stack 13 are installed before the plaster is put on the walls of the house. Lath members 22 are then put in place in front of the stack and branch walls 24 and 28. After the lath is put on, a sheet metal groove piece 20 is fastened to the wall against the lath 22. The sheet metal groove piece 20 has a forwardly extending portion 19 and a bent back portion 29 which comprise a groove 30. The front wall 28 of the branch 9 and the front wall 24 of the stack 13 have forwardly extending tongues 39 which are engaged by the groove pieces 20 in substantially air tight engagements. Plaster 21 is put on the lath 22 to form the wall 18 of the enclosure 10.

The mechanism of my device 16 is mounted on top and bottom plates 40 and is adapted to slide into the opening between the branch 9 and the stack 13 until a back wall 68 engages the conduit back wall 7. The plates 40 make substantially air tight engagements with the wall 24 of the stack 13 and with the wall 28 of the branch 9. A front face or grill portion 6 is positioned over the mechanism and rests against the plaster 21. The front face 6 engages the metal groove pieces 20 to substantially prevent air from leaking therebetween and screw means 69 firmly attach the front face 6 to the metal groove pieces 20 to hold the entire assembly in place against the plaster 21 of the enclosure wall 18. While I have illustrated the above described construction for mounting my regulating device in and to the duct system, it is to be understood that any other method may be employed.

At the top of the device 16 the wall 24 comprises part of an outlet 25 or stack 13 from the device and at the bottom of the device the wall 28 comprises part of an inlet 26 or branch 9 to the device. Air is transmitted to the device 16 by means of the branch 9 and is adapted to pass into the device 16 through the opening 26. After passing through the housing 17 of the device 16 the air passes out of the opening 25 and through the stack 13 into the room or enclosure 10. The air which enters the device 16 from the branch 9 is conditioned air and will sometimes be referred to hereafter as primary air. The device 16 has a second entrance opening indicated by the reference character 27. The second entrance opening communicates with the enclosure 10 and air from the enclosure is adapted to flow through the second entrance opening 27 and into the device 16 where it is mixed with the primary air. After being mixed with the primary air it passes out of the exit opening 25 and through the stack 13 back into the enclosure. This air which circulates from the enclosure 10 into the device 16 and back into the enclosure 10 is called secondary air.

Above the first entrance opening 26 there is positioned a substantially air tight shield 31. The shield 31 curves inwardly into the housing 17. A valve port chamber 32 is positioned under the shield 31 and in such a position that it does not extend below the downwardly extending sides of the housing 17. The valve port chamber 32 has a plurality of triangular shaped ports 33 therein through which conditioned air from the branch 9 is adapted to enter. The valve port chamber has a nozzle 34 extending through the shield 31 and into the housing 17. The conditioned air which enters the valve port chamber 32 through the ports 33 is adapted to pass in a stream through the nozzle 34 and be directed toward the exit opening 25. Surrounding the stream of conditioned air and adapted to transmit it to the exit opening 25 is an induction means 35 comprising a plurality of louvers. The bottom louver 36 is positioned over the nozzle 34 and is slightly larger than the nozzle thereby establishing a slot between the nozzle 34 and the louver 36. Each successive louver up to the top louver 37 is slightly larger than the next preceding one thereby establishing a series of slotted openings 38. The general outline of the induction means 35 is rectangular and substantially extends the full length of the housing 17, with each successive louver extending farther out than the next preceding one. Secondary air which enters the housing 17 through the openings 27 surrounds the induction means 35 and due to the primary air passing through the nozzle 34 at a controlled velocity, induction is set up at the bottom louver 36. That is, the velocity of the moving primary air causes the secondary air to be sucked through the slotted openings 38 and into the induction means 35. As the air passes each successive louver on its way up to the top louver 37 more and more air is sucked through the openings 38 into the induction means 35 where it is mixed with the primary air flowing therethrough. As each successive louver is larger than the next preceding one, there is sufficient room for the increasing volume of air to pass through the induction means without materially altering the velocity or pressure of the air therein. Care must be taken not to increase the size of the successive louvers too much or the velocity of the air passing therethrough will be reduced and induction will thereby be decreased. During its passage through the induction means 35 the primary air becomes mixed with the secondary air entering through the slots 38 and when the air reaches the exit opening 25 in the housing 17 it passes out into the stack 13 as combined or mixed air.

By setting an adjustment on my regulating device it is possible to control the volume of mixed primary and secondary air which is passed through the housing 17 and into the enclosure 10. This volume adjustment is indicated generally by the reference character 41 and once it is set my device functions automatically to keep the volume flow substantially constant. The means for regulating the volume flow comprises an impact or velocity pressure tube 42 having an open end positioned to receive an impact from a small proportion of the flow of the mixed primary and secondary air as it leaves the induction means 35. The other end of the impact tube is in communication with an air tight enclosure 43. As illustrated, the air tight enclosure 43 is formed of a substantially rigid diaphragm 44, a flexible bellows member 45 and a stationary member 46. The stationary member 46 may form part of the exit opening 25 and the impact tube 42 extends through the stationary wall 46 into the bellows enclosure. The diaphragm 44 is movable and as the velocity or total head pressure of the mixed air at the entrance opening to the impact tube 42 increases or decreases a corresponding increase or decrease in the velocity or total head pressure is transmitted to the bellows enclosure 43 and causes the diaphragm to move.

On the other side of the diaphragm from the bellows enclosure 43 there is a static pressure chamber 47 formed by a partition 52, the diaphragm 44, and the top plate 48. An opening 48 is provided in the static pressure chamber whereby the static pressure of the mixed air may be transmitted to the other side of the diaphragm 44. It is seen therefore that the diaphragm 44 moves responsive to the difference between the velocity or head and the static head of the mixed primary and secondary air. Attached to the diaphragm 44 and extending out of the static pressure chamber 47 and into the region of the secondary air is a diaphragm blade arm 49. A flexible seal 50 is provided between the static pressure chamber 47 and the region of the secondary air to permit movement of the diaphragm blade arm 49 and to prevent the flow of air from the static pressure chamber 47 to the region of the secondary air.

The diaphragm blade arm is connected to a pivotal axis 54 which is journaled in two bearing posts 55 and is adapted to oscillate slightly as the diaphragm blade arm is moved back and forth. Turnably connected to each bearing post 55 is a pair of spaced bearing wheels 56 and connected to the pivotal axis 54 is a single bearing wheel 57 adapted to roll between the pair of spaced bearing wheels 56 in the bearing post. The wheel 57 rotates easily on the wheels 56 thereby assuring that the axis 54 will pivot easily. Connected to the diaphragm blade arm 49 and adapted to move as the diaphragm blade arm 49 turns the pivotal axis 54 is a valve blade arm 58. The valve blade arm 58 extends substantially perpendicular to the pivotal axis 54 and through a slot in the shield 31 and is connected to a valve blade 59. A flexible seal 51 is provided to prevent primary air from passing into the housing 17 through the valve blade arm slot. The valve blade 59 is a flat plate extending substantially the length and width of the valve port chamber 32 and is adapted to be raised and lowered past the port openings 33 by the action of the diaphragm blade arm 49 turning the pivotal axis 54. As the valve blade 59 is raised it cuts off the opening in the valve port chamber 32 through which conditioned air may enter the housing 17. It will be seen therefore, that the function of this device is such that as the volume of the combined primary and secondary air increases, the velocity head at the impact tube 42 is increased and results in a higher pressure in the bellows enclosure 43. As the pressure in the bellows enclosure 43 is greater than the pressure in the static pressure chamber 47 the diaphragm 44 will move accordingly, causing movement of the diaphragm blade arm 49 and the valve blade arm 58. The movement of the valve blade arm 58 is such as to reduce the flow of primary air through the device and reduce the velocity head in the bellows enclosure 43 thereby bringing the volume of air discharged down to the amount set by the volume adjustment device 41.

The volume adjustment device which is indicated generally by the reference character 41 comprises an adjustable spring member 60 connected to and biasing the pivotal axis 54. An adjusting screw 61 is threadably connected to a stationary lug 62 and is adapted to be turned with respect thereto. One end of the adjusting screw 61 is connected to the spring 60 and the other end is positioned near an adjusting opening 63 in the housing 17. A screw driver may be inserted through the adjusting opening 63 to engage the adjusting screw 61 for turning same. As the outer end of the spring 60 is anchored to the adjusting screw 61, turning the screw 61 changes the tension on the spring 60 thereby moving the valve blade arm and regulating the volume of air which enters the ports 33. A shut off lever 64 is positioned on the outside of the housing 17 and connected to a cam 65 on the inside of the housing. By turning the lever 64 to the off-position, the cam 65 engages an extension 66 of the valve blade arm 58 and forces it downwardly. This causes the valve blade arm 58 which is on the other side of the pivoted axis 54 from the extension 66 to move upwardly and shut off the flow of air through the port 33. The extension 66 is lighter than the valve blade arm 58 and thus a counter weight 67 is put on to establish a substantial balance therebetween.

My device 16 is adapted to regulate the temperature in the enclosure 10 as well as regulate the quantity of air which is circulated in the enclosure. The temperature of the enclosure is controlled by the temperature of the secondary air which is removed from the enclosure through the secondary opening 27. Positioned inside the housing 17 and adjacent the secondary opening 27 are a plurality of bimetal thermostats 70. As shown, the thermostats 70 are substantially an inverted V in shape, each forming two legs, one leg being attached to a traveling nut 71 and the other leg being attached to a valve plate 72. The bent portion or hinge of the two legs forming the inverted V is positioned between two short pieces of angle iron 73 to keep the thermostat in place. The valve plate 72 which is connected to and actuated by the thermostat 72 seats against a valve seat 74 having an opening 79 therein. A temperature regulating mechanism indicated generally by the reference character 75 is provided for regulating the temperature of the air in the enclosure 10. When the temperature of the air in the enclosure 10 rises above the temperature set by the mechanism 75 the hot secondary air entering the housing 17 through the opening 27 will influence the thermostat 70 and cause the legs to bend away from each other and the valve plate 72 is thereby moved away from the valve seat 74 increasing the volume of secondary air permitted to enter the housing 17. Stops 76 are provided to prevent the valve plate from being moved too far. The increase of secondary air in the housing momentarily increases the flow of air through the induction means 35 and consequently causes a reduction in the volume of primary air admitted into the housing 17. In other words, due to too high temperature in the enclosure 10 the proportion of secondary air in the total or mixed air is increased and the proportion of primary or heated air is decreased, the total volume of air being passed into the enclosure remaining substantially the same. The valve plate 72 has two holes 80 in it through which secondary air can pass at all times. Thus, even if the valve plate 72 is tightly seated against the valve seat 74 there will be a small quantity of secondary air passing into the housing 17. This small quantity of secondary air is sufficient to influence the thermostat 70 and cause the valve plate 72 to be moved away from the valve seat 74 upon the temperature in the enclosure 10 deviating from the desired temperature set on the temperature regulating mechanism 75.

The temperature regulating mechanism 75 comprises a control knob 77 mounted on the outside of the housing 17 and a screw 78 turnably connected to the knob 77. The screw 78 is threadably connected to the traveling nut 71 in such a manner that as the knob 77 is turned the nut 71 moves and carries the thermostats 70 with it thereby changing the temperature at which the thermostats 70 actuate the valve plate 72 to open and close the opening 79 in the valve seat 74. A minimum opening fork 82 is provided so that the valve plate 72 may be kept a slight minimum distance off the valve seat 74 to cause a slight flow of secondary air through the device at all times. The fork 82 is mounted on a threaded adjusting screw 83. The adjusting screw for convenience is positioned inside the temperature adjusting screw 78 and may be actuated by a person removing the control knob 77 and turning the adjusting screw 83 with a screw driver or other suitable instrument. Turning the adjusting screw 83 to the right causes the fork 82 to engage the valve plate 72 through the valve seat opening 79 and push the valve plate 72 slightly away from the seat. It is to be clearly understood that my device can be used for either heating, cooling, or ventilating. Of course the heating cycle described above would simply be reversed for cooling functions, that is, when the temperature of the air in enclosure 10 rises above the temperature set for the regulating mechanism 75, the influence on the thermostat 70 will cause a decrease in the amount of secondary air and indirectly an increase in the amount of primary air, which on this cycle would be so called cold air.

In Figure 3 I illustrate another method of causing the diaphragm blade arm 49 to move and regulate the flow of primary air through the ports 33. A static pressure opening 84 is provided in the stationary wall member 46 for admitting static pressure to the bellows enclosure 43 and an atmospheric pressure opening 85 is provided through the partition 52 into an enclosure 86 between the partition 52 and the diaphragm 44. The chamber 86 which is on the opposite side of the diaphragm 44 from the bellows enclosure 43 thereby becomes an atmospheric pressure chamber and the diaphragm 44 will move in response to the difference between the atmospheric and static pressures existant in the two enclosures. My device has particular utility when used in a system for supplying conditioned air to a plurality of rooms or enclosures such as 10 and 11 in Figure 4. A device 16 is positioned to condition the air in each enclosure 10 and 11 and the secondary opening 27 and the outlet head 14 are in communication with the inside of the enclosure. In an installation in a home, for example, it might be the desire of the person living in the home to maintain his living room and dining room at 72 degrees, his bath room at 80 degrees and his bedroom at 65 degrees, thereby combining maximum comfort and maximum economy. A device 16 in each of the above named rooms would be set for the temperature desired and thereafter each room would be maintained at substantially the temperature set independent of the settings of the other rooms. An air conditioner 12 such as a heating, cooling, and/or ventilating device is located in the basement and is connected to the enclosures 10 and 11 by means of a distribution system 5 which includes the branches 9 leading from the distribution pipe to the device 16. A blower 15 or other means for causing substantially constant air movement is mounted on the furnace 12 and adapted to blow the conditioned air into the distribution system 5.

My device 16 automatically regulates and mixes the proper quantity of enclosure or secondary air with a controlled quantity of primary air to cause a substantially constant quantity of mixed air to be delivered to the enclosure. Due to the fact that the secondary air is recirculated the return air ducts for a plurality of enclosures are greatly reduced and simplified. In some installations, and as shown in Figure 4, only one properly centralized return air duct such as 8 is required as the only air which must be returned to the heating equipment, blower, or the like, is the maximum total amount of primary air handled at any one time by the equipment. While I have shown a return duct system in Figure 4, my regulating devices 16 may operate in a system without return ducts.

During a heating cycle all of the enclosures in my system heat up at substantially the rate at which the device is set. That is, no one or two enclosures rob the other enclosures in the system and heat up too much thereby leaving the other rooms cold, except as set by my regulating devices. In my system, if enclosure 10 started to heat up too fast the flow of conditioned or primary air rushing in to port 33 in the valve port chamber 32, together with the high pressure in the bellows enclosure 43 due to the velocity head on the impact tube 42, would cause the valve blade 59 to close off the ports 33 and reduce the flow of air therethrough, thereby increasing the amount of conditioned air available for the other enclosure 11 in the system. Thus, it will be seen that my system is governed, when properly set, to prevent too great a flow of conditioned air from entering any enclosure in the system to the exclusion of the other enclosures. My system is also governed to prevent too much heat from going to any enclosure in the system to the exclusion of any other enclosure. When enclosure 10 heats up to a temperature high enough to cause the secondary air to actuate the thermostats 70, the amount of primary air entering the enclosure 10 is reduced thereby providing more heated air available for room 11. Thus by regulating the amount of heated air entering enclosure 10 by a velocity or volume control and a thermostatic control I prevent enclosure 10 from robbing enclosure 11 and provide a balanced conditioning system for all the rooms or enclosures.

Figure 5 illustrates a modified conditioning system in which one device 16 is adapted to control the temperature of a plurality of enclosures, such for example the two enclosures 10 and 11 by means of two outlet heads 14, one of said heads 14 being in each of the enclosures 10 and 11. The air conditioner 12 and the blower equipment 15 are adapted to force conditioned or primary air through the device 16 which may be located in the basement near the air conditioner 12. The device 16 regulates the proportion of primary and secondary air which is mixed and delivered through the distribution system 5 and the outlet heads 14 to the enclosures 10 and 11. The centralized return air conduit 8 combines the return air from both enclosures 10 and 11 and delivers it to the device 16 as secondary air. A thermostat 87 controls a secondary air inlet valve 88 in accordance with the temperature of the combined return air from the enclosures 10 and 11, thereby directly controlling the secondary air recirculated and indirectly and automatically controlling the quantity of primary air which is delivered to the device 16. A pressure differential bellows 89 is provided for maintaining substantially constant the flow of mixed air to the distribution system 5. The bellows 89 is actuated according to the difference between the static and atmospheric pressures thereon. A pivotable actuating arm 91 is connected to the pressure differential bellows 89 and is adapted to be actuated as the bellows 89 moves in accordance with the pressure differential thereon. The actuating arm 91 is connected to a valve blade arm 95 at a pivot point 90 in such a manner that movement of the actuating arm causes rotation about the pivot point and movement of the valve blade arm 95 to regulate the flow of primary air into the device 16. A support 92 is provided for the pivot point 90. To provide for counterbalancing the actuating arm 91 I extend the actuating arm 91 beyond the pivot point 90. This extension is indicated by the reference character 93 and is called the counter balance arm. A weight 94 is movably positioned on the counter balance arm 93 in such a manner that manual movement of the weight 94 with respect to the arm 93 changes the torque about the pivot point 90 and affects the movement of the valve blade arm 95.

With reference to Figure 5, I would like to point out that the conduit 8 together with proper adjusting means may be constructed to return room air to the fan and conditioning equipment 12 and 15 for purposes of supplying primary air as well as supplying air to the device 16 for use as secondary air.

Another system of control would be for the return conduit 8 in Figure 5 to be connected to the air conditioner 12 as well as to the device 16 to cause enclosure air to be conditioned and returned to the enclosure 10 as primary air. It is also within the purview of this invention that the return conduit be connected directly to the air conditioner 12 and have no connection with the secondary air inlet. In this arrangement, the secondary air would be obtained from some other source.

It is to be understood that my device could be made such that any variation in the static or velocity pressure of the mixed air quantity would cause the diaphragm mechanism to bring about a change in the secondary air quantity, while the thermostatic element influenced by the secondary air or enclosure temperature would control directly the primary air. That is to say, the variation in the static or velocity head pressure, may control the quantity of secondary air, while the thermostatic device may control the quantity of primary air. This function as stated is just the reverse of the disclosed arrangement.

It is to be understood that a thermostatic control could be added which would control the primary air directly and that a thermostat for controlling both the primary and secondary air directly could also be added. These are modifications of the disclosed method of altering the proportions of primary and secondary air which go to make up the total air discharged into an enclosure.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A device for controlling the flow of air comprising, in combination, a housing, induction means with openings therein in said housing, said housing having primary inlet means through which primary air may be introduced into said induction means and having secondary inlet means through which secondary air may be introduced into said housing and around said induction means, said primary air in said induction means comprising a stream which flows through said induction means and picks up secondary air which flows through the said openings in the induction means, said housing having outlet means for the mixed primary and secondary air, means for regulating the volume of secondary air introduced into the said housing, and means responsive to the difference between the total pressure head and the static pressure head of the said mixed air for regulating the quantity of primary air passed into the said housing thereby maintaining a substantially constant discharge of mixed air from the said housing into the enclosure.

2. A device for controlling the flow of air comprising, in combination, a housing, induction means with openings therein in said housing, said housing having primary inlet means through which primary air may be introduced into said induction means and having secondary inlet means through which secondary air may be introduced into said housing and around said induction means, said primary air in said induction means comprising a stream which flows through said induction means and picks up secondary air which flows through the said openings in the induction means, said housing having outlet means for the mixed primary and secondary air, means for regulating the volume of secondary air introduced into the said housing, and pressure responsive means in contact with the stream of mixed air in the said outlet means for regulating the volume of primary air introduced into the said housing to maintain the quantity of mixed air at a substantially constant value.

3. A device for controlling the flow of air comprising, in combination, a housing, induction means with openings therein in said housing, said housing having primary inlet means through which primary air may be introduced into said induction means and having secondary inlet means through which secondary air may be introduced into said housing and around said induction means, said primary air in said induction means comprising a stream which flows through said induction means and picks up secondary air which flows through the said openings in the induction means, said housing having outlet means for the mixed primary and secondary air, manual means for regulating the volume of secondary air introduced into the said housing, means responsive to the condition of the secondary air for regulating the flow of the secondary air into the housing, and means responsive to the mixed air for regulating the flow of primary air through the said induction means to maintain the quantity of mixed air at a substantially constant value.

4. A device for controlling the flow of air comprising in combination, a housing having two entrance openings and one exit opening therein, induction means in said enclosure positioned to receive a flow of primary air through the first of said entrance openings, the second of said entrance openings introducing secondary air into said housing and around said induction means, said induction means having a plurality of openings therein through which the flow of primary air induces the secondary air to be mixed therewith, said exit opening providing means for removing said mixed air from said housing, means responsive to the condition of the secondary air to regulate the volume of secondary air introduced into the said housing, and pressure responsive means in contact with the stream of mixed air for regulating the volume of primary air which flows through the said induction means to maintain the volume of the mixed air at a substantially constant value.

5. A device for regulating the condition of air in an enclosure comprising, in combination, a housing with a first and a second entrance opening and an exit opening therein, induction means in said housing adapted to receive primary air from said first entrance opening and transmit it in a stream to said exit opening, said second entrance opening being in communication with said enclosure and adapted to pass secondary air from said enclosure into said housing, said induction means having a plurality of openings therein through which the said stream of primary air "picks up" said secondary air and transmits it as mixed air to said exit opening where it is discharged into said enclosure, manually adjustable temperature responsive means responsive to the condition of the secondary air for regulating the flow of secondary air into the said housing, means responsive to the mixed air for regulating the flow of primary air into the said induction means to maintain the quantity of mixed air at a substantially constant value, and manual means to adjust the constant value of the quantity of mixed air discharged into said enclosure.

6. A device for regulating air which is discharged into an enclosure comprising in combination, a housing with two entrance opening means and one exit opening means therein, the first of said entrance opening means adapted to pass a quantity of primary air into said housing, the second or said entrance opening means adapted to pass a quantity of secondary air into said housing wherein the said primary and secondary air mix together, the said exit opening means communicating with said enclosure and adapted to pass said mixed air into said enclosure, and means responsive to the mixed air for altering the ratio between the quantities of primary and secondary air which are passed into said housing said means including valve means in the said first of said entrance opening means for varying the primary air admitted to the housing to maintain the quantity of mixed air at a substantially constant value.

7. A device for discharging conditioned air into an enclosure comprising, in combination, a housing with a first and a second entrance opening and an exit opening therein, said first entrance opening commuicating with an air conditioning means and adapted to pass a stream of conditioned air into said housing, said second entrance opening communicating with the said enclosure and adapted to pass secondary air into said housing where the said primary and secondary air mix, said exit opening communicating with the enclosure to be conditioned and adapted to discharge the said mixed air from the said housing into the said enclosure, means responsive to the condition of the secondary air for regulating the quantity of secondary air passed into the said housing, and means responsive to the difference between the total pressure head and the static pressure head of the said mixed air for regulating the quantity of primary air passed into the said housing thereby maintaining a substantially constant discharge of mixed air from the said housing into the enclosure.

8. A device for discharging conditioned air into an enclosure comprising, in combination, a housing with a first and a second entrance opening and an exit opening therein, said first entrance opening communicating with an air conditioning means and adapted to pass a stream of conditioned air into said housing, said second entrance opening communicating with the said enclosure and adapted to pass secondary air into said housing where the said primary and secondary air mix, said exit opening communicating with the enclosure to be conditioned and adapted to discharge the said mixed air from the said housing into the said enclosure, means responsive to the condition of the secondary air for regulating the quantity of secondary air passed into the said housing, and means responsive to the difference between the static pressure of the said mixed air and atmospheric pressure for regulating the quantity of primary air passed into the said housing thereby maintaining a substantially constant discharge of mixed air from the said housing into the enclosure.

9. A device for controlling the flow of air comprising, in combination, a housing, induction means with openings therein in said housing, said housing having primary inlet means through which primary air may be introduced into said induction means and having secondary inlet means through which secondary air may be introduced into said housing and around said induction means, said primary air in said induction means comprising a stream which flows through said induction means and picks up secondary air which flows through the said openings in the induction means, said housing having outlet means for the mixed primary and secondary air, means for regulating the volume of secondary air introduced into the said housing, pressure responsive means in contact with the stream of mixed air in the said outlet means for regulating the volume of primary air introduced into the said housing to maintain the quantity of mixed air at a substantially constant value, and manual means to adjust the said responsive means to thus govern the constant value of the quantity of mixed air discharged into said enclosure.

THOMAS A. BAKER.